United States Patent [19]

Boylen

[11] Patent Number: 5,382,363
[45] Date of Patent: Jan. 17, 1995

[54] SEPTIC SYSTEM AND METHOD

[76] Inventor: Wilford M. Boylen, 2221 Surrett Dr., High Point, N.C. 27263

[21] Appl. No.: 172,927

[22] Filed: Dec. 27, 1993

[51] Int. Cl.⁶ .................................................. C02F 3/30
[52] U.S. Cl. .................................. 210/605; 210/747; 210/170; 210/532.2
[58] Field of Search ............ 210/150, 151, 170, 532.2, 210/259, 605, 620, 747

[56] References Cited

U.S. PATENT DOCUMENTS

| | | | |
|---|---|---|---|
| 848,279 | 3/1907 | Ashley | 210/170 |
| 956,665 | 5/1910 | Ashley | 210/532.2 |
| 1,950,841 | 3/1934 | Crawford | 210/170 |
| 3,525,685 | 8/1970 | Edwards | 210/620 |
| 3,579,995 | 5/1971 | Flynn | 210/170 |
| 3,680,704 | 8/1972 | Schaefer | 210/218 |
| 3,823,825 | 7/1974 | Bergles et al. | 210/170 |
| 3,914,164 | 10/1975 | Clark | 210/605 |
| 3,919,848 | 11/1975 | Sullivan | 210/170 |
| 3,962,088 | 6/1976 | Kuhlenschmidt et al. | 210/170 |
| 4,148,726 | 4/1979 | Smith | 210/620 |
| 4,218,318 | 8/1980 | Niimi et al. | 210/170 |
| 4,333,831 | 6/1982 | Petzinger | 210/170 |
| 5,198,113 | 3/1993 | Daniels | 210/608 |

Primary Examiner—Christopher Upton

[57] ABSTRACT

An underground septic tank system is provided, along with a method of constructing the same, which includes a septic tank, drain lines in a trench with a gravel bed and a concrete block aerator column. The aerator column provides a standing supply of oxygen for the drain line and surrounding gravel bed to insure sufficent aerobic bacterial activity to keep the gravel bed unobstructed therethrough.

10 Claims, 1 Drawing Sheet

SEPTIC SYSTEM AND METHOD

BACKGROUND OF THE INVENTION

1. Field Of The Invention

The invention herein pertains to sewage systems and particularly to sewage systems which utilize a septic tank and liquid drain lines joined thereto which extend to a leaching field.

2. Description Of The Prior Art And Objectives Of The Invention

With the cost of suburban sewer lines increasing due to higher construction and maintenance fees, many communities are reevaluating the advantages of individual septic tank systems for homes and other buildings. With governmental budgets a primary consideration, land which has in the past been considered marginal or not suitable for septic systems for single family households has now become more favorable in the eyes of regulatory agencies as the cost and expense of such systems is almost totally the homeowner's. Also, land which is only marginally suitable for septic systems due to its possible short term failure is now viewed somewhat differently since more dollars can be collected by the city, county or state in property taxes if a building is constructed thereon. However, this change in standards of land suitability for individual septic tank systems does not alter the percolation rate of a particular lot or acreage and consequently more and more homeowners are having to retrench their yards or lots due to the leaching field of the septic tank system failing after short term use.

Thus, with the problems and shortcomings of conventional septic tank systems on marginally suitable locations, the present invention was conceived and one of its objectives is to provide an individual underground septic tank system with an extended life expectancy.

It is another objective of the present invention to provide a method for constructing an improved septic tank system which can be readily retrofit to existing septic systems.

It is also an objective of the present invention to provide an underground septic tank system which includes an aerator positioned proximate the leach field drain lines for supplying oxygen thereto.

It is yet another objective of the present invention to provide an aerator consisting of an underground column of concrete blocks with a cap block atop the column.

It is still another objective of the present invention to provide an aerator for a septic tank system which will increase the life and performance of the septic system.

Various other objectives and advantages of the present invention become apparent to those skilled in the art as a more detailed description is set forth below.

SUMMARY OF THE INVENTION

The aforesaid and other objectives are realized by providing a septic system having a septic tank with porous drain lines in fluid communication therewith which includes aerator columns. The method of constructing the sewage system of the invention includes stacking concrete blocks one atop the other to form aerator columns which are positioned on the top of gravel beds surrounding porous drain lines from the septic tank. The concrete blocks provide a reservoir of oxygen which will allow aerobic bacterial activity to maintain the gravel beds free of obstructions of solid and semi-solid waste which pass into the drain lines from the septic tank. A solid concrete cap block is positioned atop the concrete aerator column to maintain the interior block channels free and clear of dirt and debris.

DESCRIPTION OF THE PREFERRED EMBODIMENT

Figure 1:
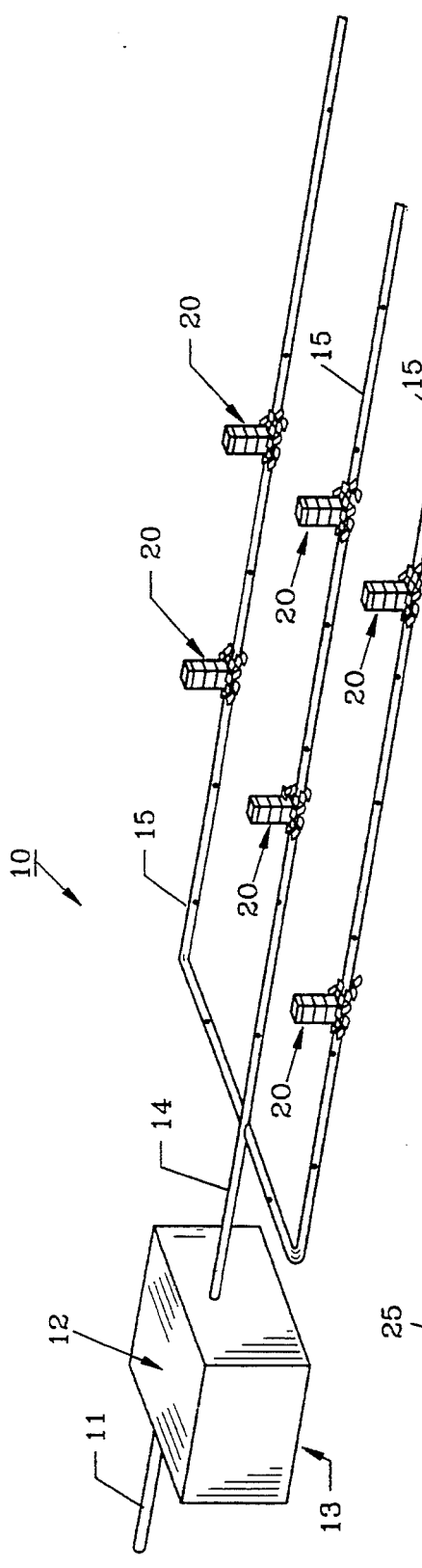
FIG. 1 illustrates a typical installation of a septic tank system of the invention having a plurality of drain lines with aerator columns.
Figure 2:
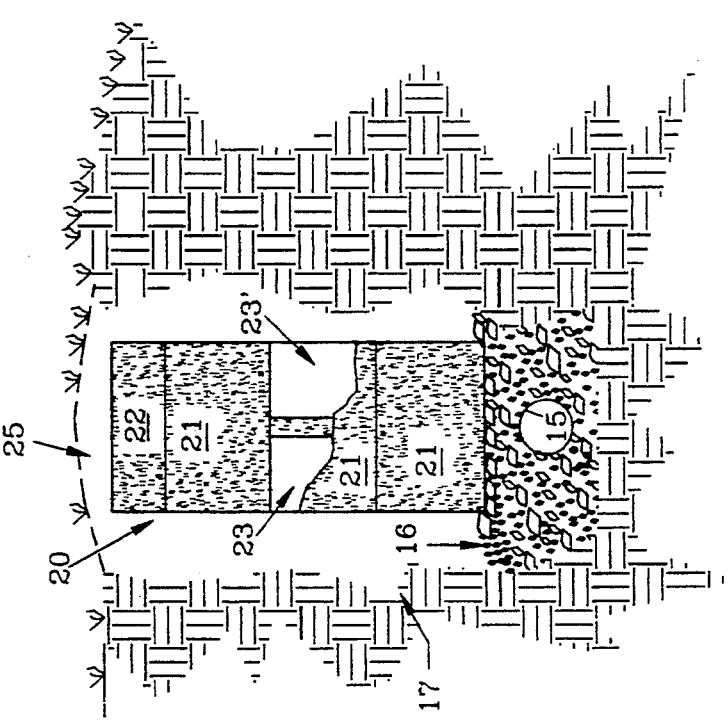
FIG. 2 demonstrates a close-up enlarged elevational view of the aerator column atop the drain line gravel bed.

The preferred form of the invention is demonstrated in FIGS. 1 and 2 whereby a septic tank system utilizes a plurality of porous, plastic drain lines having aerator columns spaced therealong. The septic tank system as shown is underground and each aerator column is formed from conventional 8 inch×8 inch concrete blocks as are used in the building and construction trade. In the preferred septic tank system embodiment, the drain lines are formed from conventional 4 inch diameter plastic pipes which are perforated and placed in trenches approximately 3 feet deep. A gravel bed of approximately 8 to 10 inches in depth is first laid in the trench and the porous drain line, which is connected to an installed septic tank, is placed thereon. Next, gravel is poured atop the drain line to bury it approximately 4 inches. Next, concrete block aerator columns are placed atop the gravel bed and three such blocks may be placed one atop the other with a conventional 4 inch cap block to form a preferred column. Next, the trench is filled with earth and the cap block is completely covered. The open channels within the concrete blocks provide air pockets for a ready supply of oxygen for the drain lines. As would be understood, some solid waste usually overflows from the septic tank after an extended period of use and travels down the drain lines where it passes onto the gravel bed, causing the bed to become obstructed and preventing liquid waste passage. The available oxygen from the aerator columns will cause an increase in the aerobic bacterial activity of digesting the solid waste, which will therefore keep the gravel beds free of obstructions, allowing liquid to readily flow from the drain line through the gravel bed to infiltrate the earth below.

DETAILED DESCRIPTION OF THE DRAWINGS AND OPERATION OF THE INVENTION

Turning now to the drawings, FIG. 1 shows septic tank system 10 (removed from the ground for clarity) for treating sewage from a house or other building. As seen, septic system 10 includes sewage inlet line 11, septic tank 12, and drain lines 15. The components just described are all conventional and are in common use as are drain manifolds, vent pipes, filters and the like. Septic tank 12 receives solid, semi-solid and liquid waste through inlet line 11 whereafter the majority of solid matter settles along bottom 13 of septic tank 12. Liquid and, inadvertently, some semi-solids and solids pass through outlet line 14 where such waste is then directed into porous drain lines 15 as positioned in a leaching field (not shown) for seepage into gravel bed 16 as shown in FIG. 2. Gravel bed 16 is conventional and surrounds each drain line 15 in drain lines trenches 17 as also seen in FIG. 2. It is expected that liquid waste from septic tank 12 will readily flow through drain lines 15, seep through gravel bed 16 and will infiltrate the surrounding earth. However, it is quite common for conventional drain line trenches to become clogged with solid waste and be rendered unuseable, necessitating that the trenches be replaced. Clogging occurs when the interstices of gravel bed 16 become obstructed with solid or semi-solid waste which often overflows from septic tank 12 after extended use. Aerobic bacteria cannot destroy these obstructions in conventional septic systems, to the great dismay of the owners. To overcome this problem and to increase aerobic bacterial activity, vertical concrete aerator columns 20, as shown in FIG. 1, are constructed with the lower ends of columns 20 resting on the top of gravel bed 16. Porous concrete blocks 21, preferrably in the form of standard concrete blocks, as are used in building wall constructions, are vertically aligned, one on another, and each includes a pair of internal channels 23, 23' therein, which provide pockets for air storage. As shown, vertical concrete aerator columns 20 are below ground and cannot be seen under normal conditions and provide no above-ground hazards as do conventional vent pipes which can be damaged by lawnmowers, vehicle traffic or the like atop the leaching field.

The method of constructing septic tank system 10, as shown in FIG. 1, comprises installing conventional underground septic tank 12 and joining it to one or more underground porous drain lines 15 as needed for the anticipated capacity. With drain lines 15 installed in standard gravel beds 16 of trenches 17, porous concrete blocks 21 are positioned one on another with block cap 22 on top to form vertical concrete aerator column 20, as shown in FIG. 2. Lastly, earth is then pushed or shoveled to cover drain lines 15, vertical concrete aerator columns 20 and septic tank 12. Vertical concrete aerator columns 20 approximately two feet in height have been found effective when spaced at 25 to 50 foot intervals along 4 inch diameter drain lines 15. Drain lines 15 are usually 50 to 75 feet in length but may vary under different conditions. With vertical concrete aerator columns 20 so placed, aerobic bacterial activity is greatly increased and drain lines 15 and gravel beds 16 remain unobstructed for liquid sewage to infiltrate the surrounding earth for greatly extended periods of time.

For existing septic tank systems, wells 25 can be dug in the earth above drain lines 15 approximately 12 inches in diameter and of sufficient depth until gravel bed 16 or, in some cases, porous drain lines 15 are reached. Next, concrete blocks 21 are placed one atop another and cap block 22 is placed on upper block 21. Earth is then used to fill well 25 around and over vertical concrete aerator column 20 so formed whereby vertical concrete aerator column 20 will remain underground to provide available oxygen for drain line 15 as additional oxygen is needed. Vertical concrete aerator column 20 renews its oxygen supply from the surrounding earth as expended and additional treatment is generally not necessary.

The illustrations provided herein are for explanatory purposes only and those skilled in the art can modify the system and method for particular uses. Thus, the examples shown are not intended to limit the scope of the appended claims.

I claim:

1. An underground septic system comprising: a septic tank, a drain line, said drain line in fluid communication with said septic tank, a closed top underground aerator, a vertical porous bed, said aerator contiguous to said porous bed, said drain line in contact with said porous bed to supply oxygen from said aerator, through said bed to said drain line, said aerator comprising a vertical porous column having internal air pockets, extending upwardly from said porous bed to allow air to flow from the surrounding earth therethrough to said drain line.

2. An underground septic system as claimed in claim 1 wherein said column comprises a plurality of concrete blocks.

3. An underground septic system as claimed in claim 2 wherein said concrete blocks are stacked one atop another in vertical alignment.

4. An underground septic system as claimed in claim 2 wherein said concrete blocks comprise building blocks.

5. An underground septic system as claimed in claim 1 and including a solid cap block, said cap block positioned atop said column.

6. An underground aerator for a drain line comprising: a closed top vertical porous column having internal air pockets, said column positioned proximate to and extending upwardly from said drain line and in fluid communication therewith.

7. An underground aerator as claimed in claim 6 wherein said porous column comprises a plurality of concrete blocks, said blocks positioned in a ground well.

8. An underground aerator as claimed in claim 7 wherein said plurality of concrete blocks include a solid cap block.

9. A method of forming a septic system comprising the steps of:
    (a) installing an underground septic tank;
    (b) joining said septic tank to an underground drain line;
    (c) placing a porous bed over said drain line; and
    (d) installing an underground closed vertical porous column having internal air pockets contiguous to and extending upwardly from said porous bed to allow aeration of the drain lines with oxygen therefrom.

10. The method of claim 9 wherein the step of installing a porous column comprises constructing a porous column of concrete blocks.

* * * * *